United States Patent [19]

Sadr

[11] Patent Number: 5,716,093
[45] Date of Patent: Feb. 10, 1998

[54] ENERGY ABSORBING BOLSTER FOR VEHICLE DOOR

[75] Inventor: Changize Sadr, North York, Canada

[73] Assignee: ABC Group, Rexdale, Canada

[21] Appl. No.: 779,559

[22] Filed: Jan. 7, 1997

[51] Int. Cl.⁶ .................................................. B60R 27/00
[52] U.S. Cl. ........................ 296/146.6; 296/188
[58] Field of Search ....................... 296/146.6, 188, 296/189

[56] References Cited

U.S. PATENT DOCUMENTS

| | | |
|---|---|---|
| 3,808,743 | 5/1974 | Renner et al. |
| 3,964,208 | 6/1976 | Renner et al. |
| 3,989,275 | 11/1976 | Finch et al. |
| 5,066,064 | 11/1991 | Garnweidner |
| 5,098,124 | 3/1992 | Breed et al. |
| 5,102,163 | 4/1992 | Ishikawa |
| 5,141,279 | 8/1992 | Weller |
| 5,154,445 | 10/1992 | Weller |
| 5,306,066 | 4/1994 | Saathoff |
| 5,306,068 | 4/1994 | Nakae et al. |
| 5,382,051 | 1/1995 | Glance .................. 296/189 |
| 5,395,135 | 3/1995 | Lim et al. |
| 5,435,619 | 7/1995 | Nakae et al. |
| 5,542,738 | 8/1996 | Walker et al. |

*Primary Examiner*—Gary C. Hoge
*Attorney, Agent, or Firm*—George A. Seaby

[57] ABSTRACT

Energy absorbing bolsters for vehicle doors are usually formed of non-recyclable foam plastic and/or metal. A relatively simple bolster, which can be formed of recyclable plastic, includes a hollow body with a hole therein for equalizing interior and exterior pressure, and permitting limited flexing of the body, and reinforcing ribs on the outer and side walls of the body, so that the latter can be relatively thin walled.

7 Claims, 4 Drawing Sheets

FIG. 1
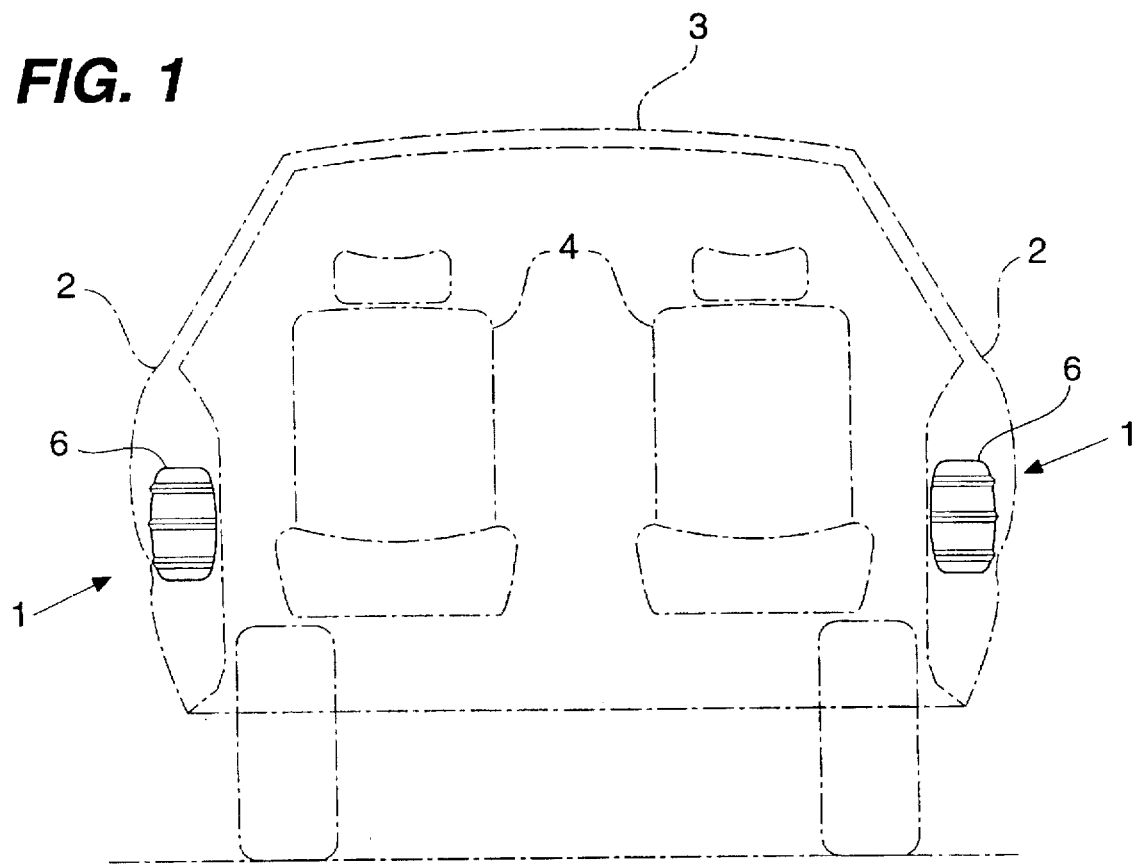
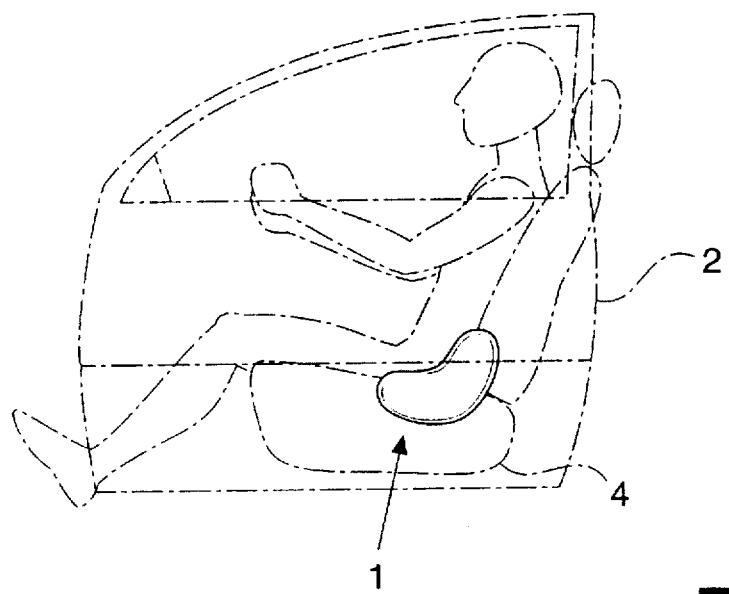
FIG. 2

ENERGY ABSORBING BOLSTER FOR VEHICLE DOOR

BACKGROUND OF THE INVENTION

1. Field of the Invention

This invention relates to an energy absorbing bolster for a vehicle door.

2. Discussion of the Prior Art

Examples of energy absorbing structures for use in automotive vehicle doors are found in U.S. Pat. Nos. 3,808,743, which issued to H. Renner et al on May 7, 1974; 3,964,208, which issued to H. Renner et al on Jun. 22, 1976; 3,989,275, which issued to P. M. Finch et al on Nov. 2, 1976; 5,066,064, which issued to P. Garnweidner on Nov. 19, 1991; 5,098,124, which issued to D. S. Breed et al on Mar. 24, 1992; 5,102,163, which issued to T. Ishikawa on Apr. 7, 1992; 5,141,279, which issued to P. A. Weller on Aug. 25, 1992; 5,154,445, which issued to P. A. Weller on Oct. 13, 1992; 5,306,066, which issued to D. G. Saathoff on Apr. 26, 1994; 5,306,068, which issued to T. Nakae et al on Apr. 26, 1994; 5,395,135, which issued to G. G. Lim et al on Mar. 7, 1995; 5,435,619, which issued to T. Nakae et al on Jul. 25, 1995 and 5,542,738, which issued to L. A. Walker et al on Aug. 6, 1996.

As the above-referenced patents illustrate, in the past, vehicle doors were produced with metal reinforcing bars to absorb the shock of an impact from the side of the vehicle. More recently, such reinforcing bars were replaced by or supplemented with energy absorbing bolsters formed of foam plastic, e.g. polyurethane and even hollow, plastic bolsters. While existing plastic energy absorbing devices may perform in a satisfactory manner, they are usually formed of a material which is neither biodegradable nor recyclable.

GENERAL DESCRIPTION OF THE INVENTION

The object of the present invention is to provide a solution to the above described problem in the form of a simple, hollow, energy absorbing bolster formed of a recyclable plastic.

Accordingly, the present invention relates to an energy absorbing bolster for a vehicle door comprising hollow, blow molded plastic body means for mounting in a vehicle door; a hole in said body means for equalizing interior and exterior air pressure and permitting limited flexing of said body means; and reinforcing rib means on said body means.

BRIEF DESCRIPTION OF THE DRAWINGS

The invention is described in greater detail hereinafter with reference to the accompanying drawings, which illustrate preferred embodiments of the invention, and wherein:

FIG. 1 is a schematic, cross-sectional view of an automobile containing energy absorbing bolsters in accordance with the present invention;

FIG. 2 is a schematic side view of the door area of an automobile containing an energy absorbing bolster in accordance with the invention;

DESCRIPTION OF THE PREFERRED EMBODIMENT

Figure 3:
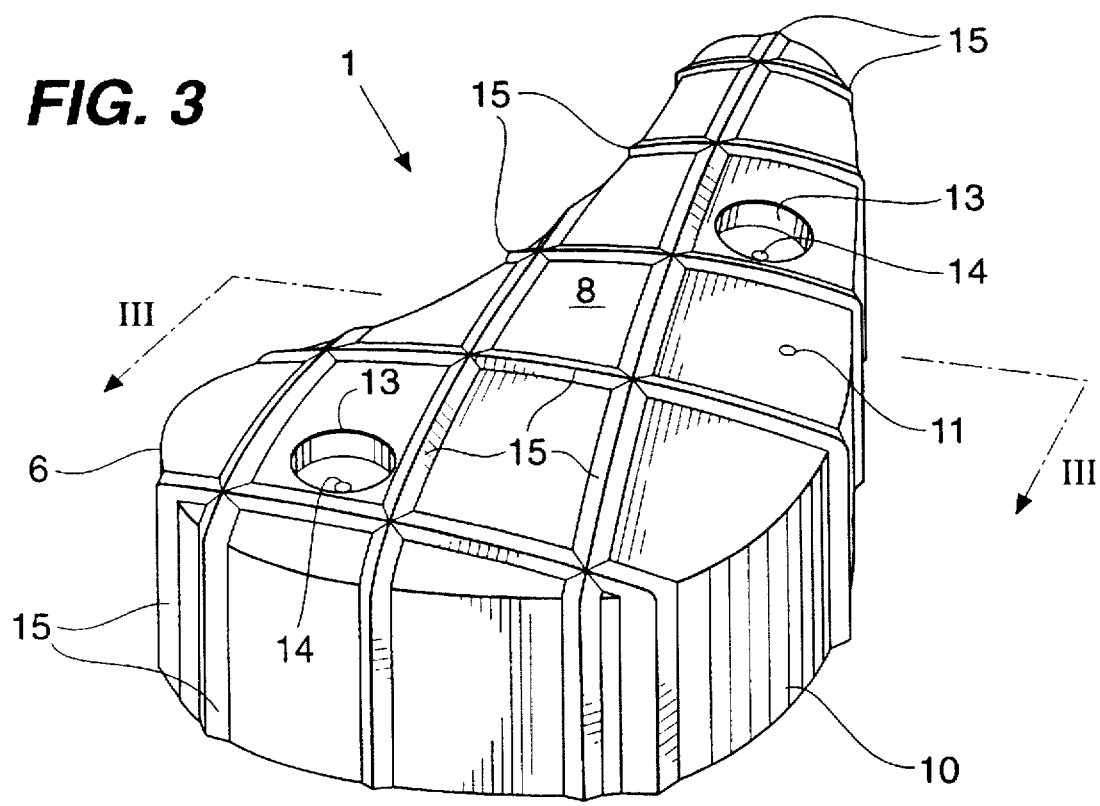
FIG. 3 is a schematic, perspective view of a first embodiment of the bolster of the present invention.

With reference to FIGS. 1 and 2, the energy absorbing bolster of the present invention which is generally indicated at 1 is intended for use in the doors 2 of an automotive vehicle 3. As mentioned above, the bolster 1 is intended to absorb shocks or energy as a result of an impact against either side of the vehicle, i.e. against either of the doors 2. As is well known from the prior art, the presence of the bolsters 1 in the doors 2 provides additional protection for passengers seated in the seats 4 of the vehicle 3.

Figure 4:
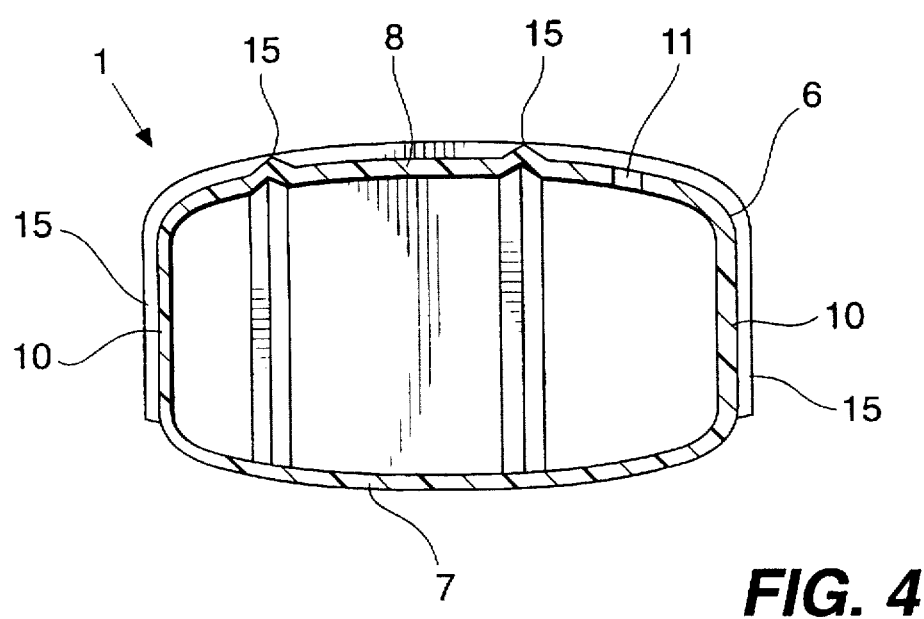
FIG. 4 is a cross-section taken generally along line III—III of FIG. 3.
Figure 5:
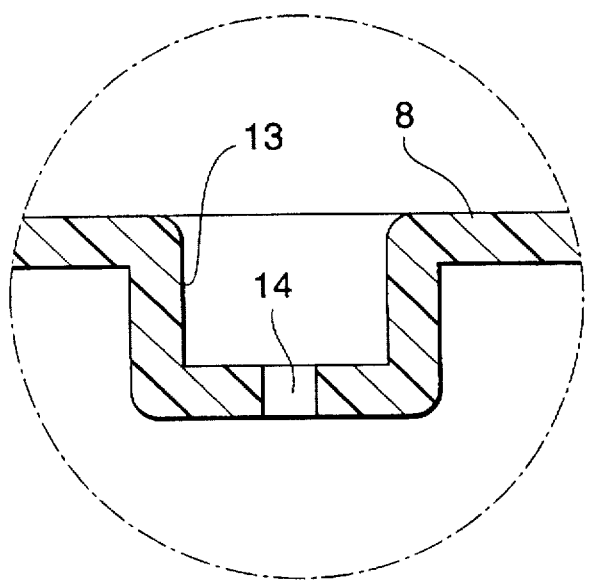
FIG. 5 is a cross-section of a mounting recess in the bolster of FIGS. 3 and 4.

Referring to FIGS. 3 and 4, one embodiment of the bolster 1 includes a hollow, blow molded, plastic body 6. The body 6 is defined by inner and outer walls 7 and 8, respectively, which are interconnected by a side wall 10. An air hole 11 is provided in the wall 7 for equalizing the pressure inside and outside of the body 6. A pair of spaced apart recesses 13 with holes 14 in the bottom center thereof are also provided in the inner wall 7 of the body 6 for receiving screws or other fasteners (not shown).

The body 6 is reinforced by a plurality of exterior ribs 15 extending longitudinally and transversely of the body. The ribs 15 are formed during the blow molding process, and make it possible to use relatively little material in the bolster, i.e. to make relatively strong, thin walled bolsters.

While the bolster illustrated in FIG. 3 has a particular shape and tapers from end to end, it will be appreciated that the dimensions and the shape of the bolster can be altered to suit a variety of doors. The shape and dimensions of the bolster must be such that the bolster does not impede movement of the vehicle window in the door 2.

In the following description of second and third embodiments of the invention, wherever possible the reference numerals of FIGS. 3 and 4 have been used to identify the same or similar elements.

Figure 6:
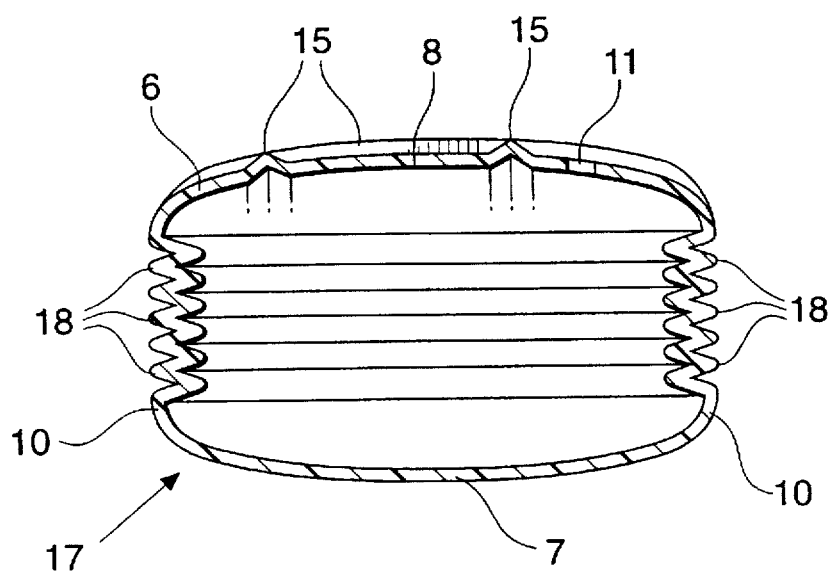
FIG. 6 is a cross-sectional view of a second embodiment of the bolster of the present invention.

Referring to FIG. 6, a second embodiment of the invention, which is generally indicated at 17 includes a hollow body 6 similar to the body of FIGS. 3 and 4, except that the side wall 10 is provided with accordion pleats 18 extending around the periphery thereof. The pleats 18 provide flexibility to the side wall 10. The number and stiffness of the pleats 19 can be varied depending upon the desired energy absorbing properties of the bolster. In the second embodiment of the invention, the exterior ribs 15 do not extend along the side wall 10, since the ribs would interfere with the flexing permitted by the pleats 18.

Figure 7:
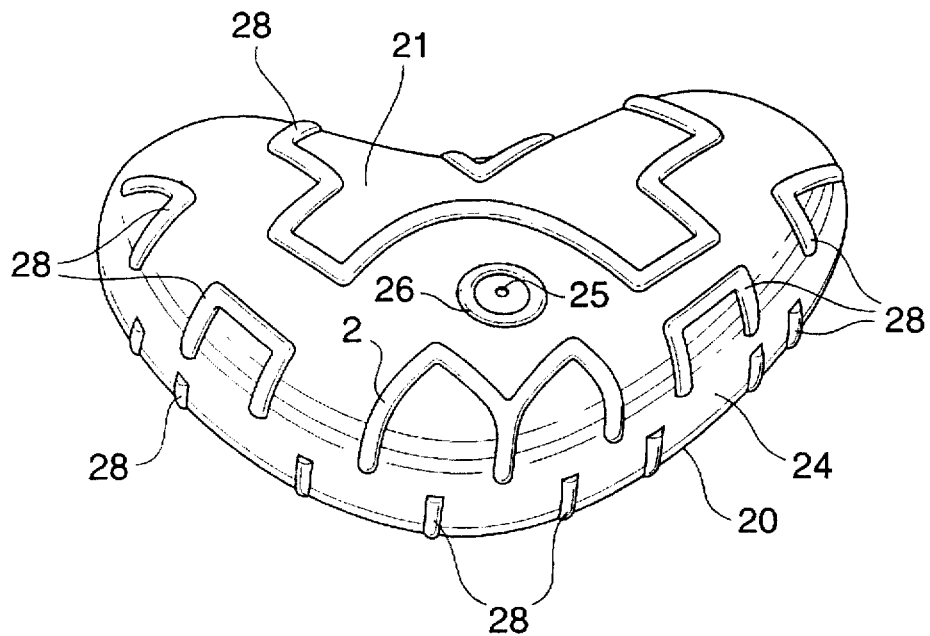
FIGS. 7 and 8 are isometric views of a third embodiment of the bolster of the present invention.
Figure 8:
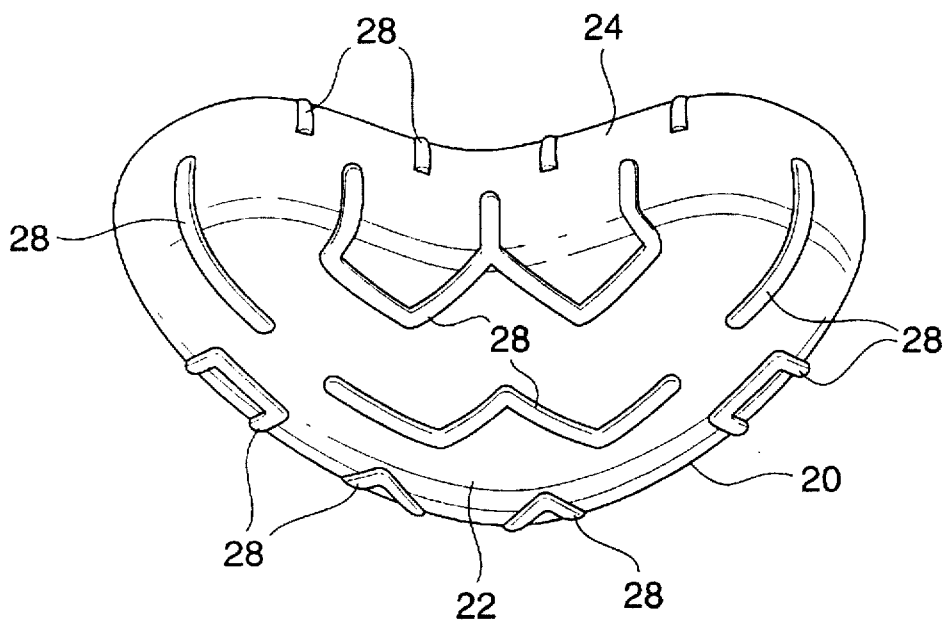

With reference to FIGS. 7 and 8, a third embodiment of the invention includes a generally kidney-shaped body 20. The body 20 is defined by inner and outer walls 21 and 22, respectively which are interconnected by an integral side wall 24. All of the corners of the body 20 are rounded. An air hole 25 is provided in the inner wall 21 for equalizing pressure inside and outside of the body 20. The hole 25 is surrounded by an annular projection or rib 26, which also serves to reinforce the body 20. Additional reinforcing ribs 28, are provided on one side of the body 20. The ribs 28 have a variety of shapes, including straight, generally U-shaped, generally V-shaped, generally W-shaped and generally M-shaped.

The use of a blow molded plastic energy absorbing bolster provides distinct advantages over solid or foam bolsters, including the fact that the bolster can be produced using a recyclable thermoplastic material such as polyethylene, polypropylene or TPO (thermoplastic polyolefin). The preferred wall thickness of the body 6 is 1 to 6 mm. As in the case of the shape and dimensions, the wall thickness will depend upon various factors including the desired flexibility of the bolster.

I claim:

1. An energy absorbing bolster for a vehicle door comprising a hollow, blow molded, thermoplastic body for mounting in a vehicle door; a hole in said body for equalizing interior and exterior air pressure and permitting limited flexing of said body; and a plurality of reinforcing ribs on said body, said reinforcing ribs extending longitudinally and transversely of the exterior of the body.

2. The bolster of claim 1, wherein said body includes parallel inner and outer walls; side walls extending between said inner and outer walls, and accordion pleats in said side walls permitting flexing of said side walls when the outer wall of the bolster is subjected to pressure.

3. The bolster of claim 1, wherein said body is formed of a material selected from the group consisting of polyethylene, polypropylene and thermoplastic polyolefin.

4. The bolster of claim 3, wherein said body has a wall thickness of 1 to 6 mm.

5. The bolster of claim 4, wherein said body includes parallel inner and outer walls; side walls extending between said inner and outer walls, said ribs extending longitudinally and transversely of said outer walls and transversely of said side walls.

6. The bolster of claim 5, including a recess in said outer wall for receiving a fastener for mounting the body in a vehicle door.

7. The bolster of claim 4, wherein said body is generally kidney-shaped and includes inner and outer walls; and side walls interconnecting said inner and outer walls, said ribs having a variety of shapes.

* * * * *